April 4, 1961 H. E. VON GRONOW ET AL 2,977,721
METHOD OF MANUFACTURING LIGHT-WEIGHT, POROUS ACID SLAG
Filed May 20, 1957 2 Sheets-Sheet 1

April 4, 1961   H. E. VON GRONOW ET AL   2,977,721
METHOD OF MANUFACTURING LIGHT-WEIGHT, POROUS ACID SLAG
Filed May 20, 1957   2 Sheets-Sheet 2 ns
2,977,721
METHOD OF MANUFACTURING LIGHT-WEIGHT, POROUS ACID SLAG

Harald Elsner von Gronow, Schone Aussicht 26, Wolfhagen, Kassel, Germany, and Georg Gutperle, Lerchenstr. 3, and Otto Hager, Kernerstr. 51, both of Marbach (Neckar), Germany Filed May 20, 1957, Ser. No. 660,337

Claims priority, application Germany May 19, 1956

12 Claims. (Cl. 49—77.5)

The present invention relates to a method of manufacturing a light admixture for slag concrete or the like.

It is known to granulate the slag of melting vessels as molten slag, such as from a blast furnace, in power works by means of quenching in water and to use these granules for the manufacture of heavy concrete. These comparatively acid slags with contents of silicic acid up to 60% solidify during the granulating process in water to a glass-like appearance, while, in contradiction thereto, the basic blast furnace slags, which are rich in lime, provide also crystals in limited quantities during the granulating process in water depending upon their constitution.

During the manufacture of smelting house products it is even possible to achieve such slow cooling of the foamy, basic blast furnace slags by using comparatively little water, that practically all is crystallized. This method cannot be used, however, in order to work the acid vessel slags to blast furnace like slag. An essential reason is the comparatively high viscosity of the acid slag at a temperature range of about 1300° to 1400° C., that is at the temperature at which it is removed from the melting vessel. A foaming of the acid vessel slag with water cannot be achieved in easy manner.

For the same reason another known method of manufacturing of porous, foamy slags cannot be applied, according to which method the melt, made foamy by steam, is subjected to a fast cooling to a temperature at which the blisters do not burst any more, while the foam retains its elastic state, whereupon the mass is brought into the desired shape and is further cooled to solidification. The foam is hereby cooled from a temperature of about 1000° to about 800° C. by feeding the same between water-cooled metal rollers, and then slowly further cooled, in order to avoid the creation of any tension in the porous material.

In accordance with another known method molten blast furnace slags, which contain gases in oversaturated solutions, are stirred, in order to free the gases from the solution. It has been proposed in this known method to control the viscosity of the slag by cooling and stirring in such manner, that the slags contain the desired amount of gas blisters after their solidification and, thus, have the desired porousness. No information is known about the particulars of the cooling method. The slag is supposed to contain a sufficient number of blisters during its removal from the stirring machine, in order to solidify in the form of foam. Such stirring method cannot be applied, however, to the acid vessel slag in view of its high viscosity, and the vessel slag does not contain always gases dissolved in surplus, in order to render it sufficiently porous by stirring. A further distinction may be found in the fact that the slags are molten in accordance with the known method, at overpressure, while in the vessels a low pressure is present.

It is, therefore, one object of the present invention to produce porous, glass-like granules from acid vessel slag by means of a method which is adjusted to the particular nature of this slag. This method operates under the assumption that such slag contains likewise gases dissolved at a high temperature, which gases are, however, not freed in proper manner during the fast quenching period, as used at the present time in melting vessels. If the liquid slag stream leaving the melting vessel is cooled at first to temperatures above 700° C. in such manner that the slag temperature is reduced to the temperature range of the most favorable gas release in the form of small blisters above 700° C., preferably at about 800° C. to 900° C. for a sufficient time interval, for instance 2 to 10 minutes, then it is possible to cool the slag comparatively fast within the temperature range of 700° C. down to about 560° C., for instance in about 1 to 2 minutes, without creating intolerable cooling tensions. The temperature of 700° C. constitutes the limit temperature for vessel slags, below which a gas release cannot be obtained any more.

During the annealing interval of the glass-like material at about 560° C. to 490° C., wherein the viscosity reaches the value of about $10^{13}$ c.g.s. units, the cooling speed must be comparatively slow, preferably at an average of no more than about 5° C. to 10° C. per minute, in order to avoid cooling tensions which reduce the rigidity of the final product. The cooling speed can be increased again, however, at a temperature below 490° C., without influencing injuriously the quality of the final product, and for instance, a quenching in water is possible.

It is, thus, another object of the present invention to provide a method of manufacturing porous acid slag, which comprises the steps of reducing at first the temperature of the liquid slag stream in known manner to a point, at which the gases dissolved therein are freed, to be followed by a faster cooling step upon reaching the lower limit of the temperature range wherein the gases are freed, and then to be followed by a slow cooling step until the range of high viscosity reaches a value of about $10^{13}$ c.g.s. units, and finally to cool at any speed upon reaching a temperature which is below the transformation temperature of the glass, for instance a fast cooling period of the glass-like, lightened product may follow. The slow cooling within the range of high viscosity is brought about in accordance with the present invention preferably by heat radiation during the downward movement of the particles of the glass-like material to be cooled in a shaft by gravity without the use of particular conveyor means.

It is yet another object of the present invention to provide a method of manufacturing porous acid slag which is performed in such manner that during the first temperature interval the gases dissolved in the slag are freed in the form of small blisters, for instance of 1 to 2 mm. in diameter. In this manner a low weight per liter is obtained, while the rigidity of the structure is insufficient if greater pores are created and upon breaking up the product the weight per liter rises again. The volume of the pores should be preferably about 25%, so that the weight per liter is reduced from about 1.55/1.7 to about 1.3/1.1 and below, corresponding with a reduction of the specific weight of 2.65 to the specific weight of about 2.0.

For economical reasons it is of great importance that the temperature range from the limit temperature of freeing the gases to the softening interval of the glass-like material is passed rapidly, bringing about an appreciable saving in time and of the length of the cooling apparatus. The last fast cooling period upon reaching a point below the transformation temperature amounts likewise to a time shortening and simplification of the apparatus. The viscosity is already so high at this stage, that no gas is freed any more, and, for this reason, an increase in volume or a jamming in the shaft, but also a sticking together of the broken-up particles is excluded. The method designed in accordance with the present invention avoids also all drawbacks experienced during the conventional operation of the melting vessels, namely spontaneous breaking-up of the quenched glass-like material or breaking-up of the glass-like material under a small load due to the high cooling tension, tension corrosion on the mound, non-checkered shape of the additives formed by breaking-up the quenched product, and injuries to workers engaged in the manufacture of a non-inventive additive to the concrete due to pointed glass splinters and rods. The conventional melting vessel has in the furnace a low pressure, and for this reason the apparatus is airtight, the outlet connecting branch dips into water or a collector flap is provided. The same expedient is advisable, if the vessel runs in the furnace with overpressure instead of with lower pressure.

It is yet another object of the present invention to provide a method of manufacturing porous acid slag, which method is further improved by adding a material which forms pores for gas blisters to the liquid slag stream prior to the cooling to the temperature required for freeing the gases contained in the slag. In this manner, it is achieved that the freeing of the gases is appreciably faster than herebefore and that the material to be treated may pass the temperature range for freeing the gases much faster. This in turn permits of acceleration of the entire process and simplification and reduction of the size of the apparatus performing the process compared with conventional apparatus. A further advantage of the present invention is found in the fact that the freeing of the gases, upon reaching the temperature favorable therefor, takes place under draft, due to the presence of the pores in the gas blisters, and, thereby, small gas blisters are formed in great numbers, as it is desirable during the manufacture of porous slags. Simultaneously the danger is excluded, that a low temperature of the slag and consequently a sudden freeing of gases may occur, which is of disadvantage for the control of the process and its safety of operation.

It has been found particularly beneficial to admix to the slag stream, prior to its cooling to the temperature required for the freeing of the gases, a burning material, preferably coal powder or a mixture of oil-containing matter with carrier substances, as for instance wood-flour or brick- or tile-dust. In this manner, in addition to the introduction of pores for the formation of gas blisters, the reduction of the higher oxides of the slag is also achieved.

The coal powder or the like is admixed to the slag stream preferably at an amount of about 0.5% of its weight. This can be brought about in best manner by blowing the coal powder or the like onto the slag stream and stirring the mixture at a temperature of about 1300° C. Between the stirring in of the coal powder or the admixing of oil-containing matter with carrier substances, for instance wood-flour or brick- or tile-dust, and the following treatment of the slag stream, it is of advantage to await a reaction period of about 10 to 40 seconds.

The method set forth above has been described in an application for melting vessel slag, though it lends itself generally for the solution of similar problems, for instance for blowing up of obsidians of volcanic origin found on the Lipari Isles and Sardinia, which obsidians contain gases dissolved therein in large quantities and practically are used already to a great extent for the manufacture of light admixtures to concrete and similar purposes.

With these and other objects in view which will become apparent in the following detailed description, the present invention will be clearly understood in connection with the accompanying drawings, in which.

Figure 1:
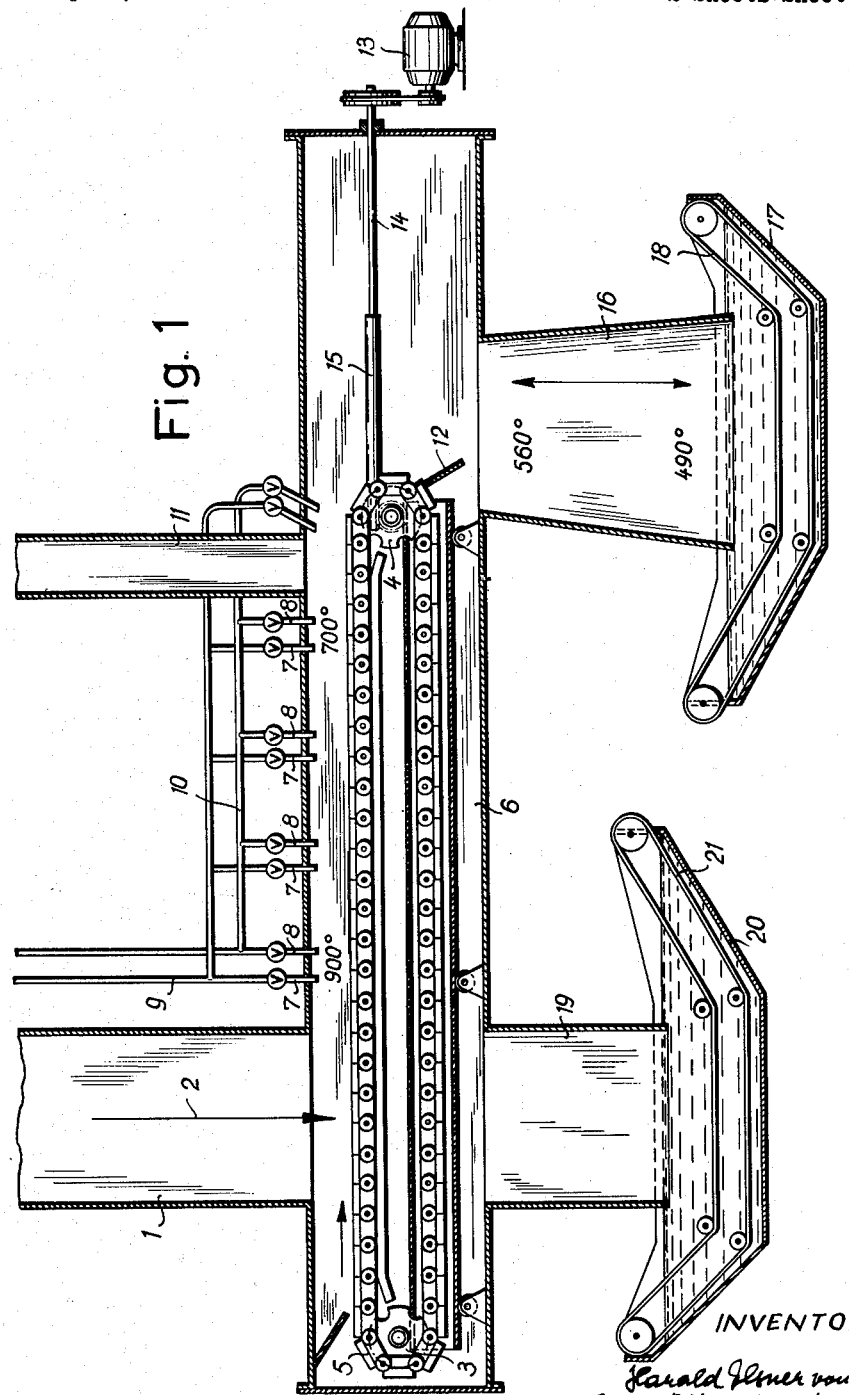
Figure 1 is a schematic longitudinal section of one embodiment of the apparatus.

Referring now to the drawings and in particular to Fig. 1, the apparatus comprises a shaft 1 of an inner diameter of about 800 to 1000 mm. through which the acid vessel slag flows from the melting vessel (not shown) in a stream 2 towards the endless plate conveyer band 5 running over the rollers 3 and 4, which conveyer band 5 is disposed in airtight manner in the channel 6. Adjustable water nozzles 7 and/or air nozzles 8 are disposed above the conveyer band 5 for about two-thirds or one-half of its length, which water nozzles 7 and/or air nozzles 8 are connected with a water and air feeding system 9 and 10, respectively, which systems 9 and 10 may be controlled by means of valves. The speed of the conveyer band 5 and the injection of the cooling medium are arranged in such manner that the slag layer travelling on the conveyer band 5 is cooled within the given length from 900° C. to 700° C. within a period of about 5 minutes. An upwardly extending smoke suction shaft 11 is arranged at the end of the channel 6. The slag rendered viscous during its travel is cooled from about 700° C. to 560° C. behind the gas freeing zone until the band reaches the return roller 4 by means of water, pressurized air or the like. By this treatment the slag is rendered glass-like and jumps off automatically from the plates of the conveyer band or it is removed by the immovable stripper 12.

The drive of the plate conveyer band 5 is achieved advantageously by means of a motor 13 disposed outside of the channel 6, which motor 13 drives the roller 4 over the shaft 14 by means of a pinion or the like. The shaft 14 may be disposed in a protecting tube 15 within the range of the slag removed from the conveyer band 5.

A shaft 16 is connected with the channel 6 below the stripper 12, which shaft 16 constitutes the cooling zone and is advantageously slightly conically widened in downward direction. A basin 17 filled with water is disposed below the shaft 16 and the lower edge of the shaft 16 extends below the level of the water of the basin 17. The completely cooled off slag is fed away from the lower end of the shaft 16 in downward manner, for instance by means of the conveyer band 18.

An additional shaft 19 is connected with the front part of the channel 6, which shaft 19 penetrates with its lower edge below the water level into a basin 20, which is likewise equipped with a conveyer band 21.

The shaft 16 is continuously filled with slag during the operation. The height and diameter of the shaft 16, as well as the feeding capacity of the conveyer band 18 are adjusted in such manner that the slag falling down from the stripper 12 at a temperature of about 560° C. is cooled off for about 5° to 10° C. each minute until the temperature is down to about 490° C. at the time the water level is reached in the basin 17.

The shaft 19 with the basin 20 constitutes merely a safety device which is rendered operative only in case of a disturbance in the endless plate conveyer band 5. The slag goes then directly from the stream 2 into the basin 20 and is then quenched in conventional manner, in which case, of course, all advantages of the inventive method are lost.

Figure 2:
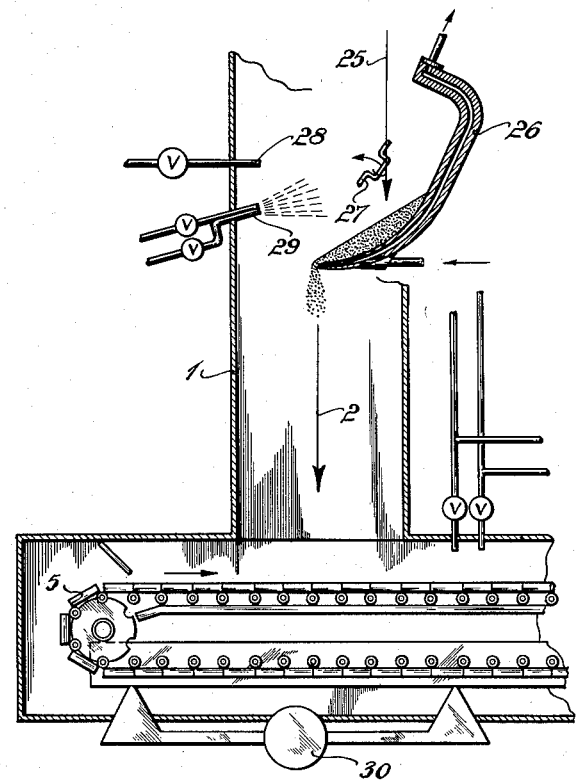
Fig. 2 is a fragmentary section of another embodiment of the apparatus.

If some matter is to be added to the liquid slag stream, which matter forms pores in the slag for the formation of gas blisters, it is of advantage to apply the additional apparatus disclosed in Fig. 2 of the drawing. A water cooled pot 26 is swingably mounted in the shaft 1 and a stirrer 27 moves in the pot 26. A nozzle 28 projects through the wall of the shaft 1 opposite the pot 26, which nozzle 28 is adapted for feeding of burnable matter in powder or liquid form, for instance, of coal powder or a mixture of oil-containing matter and carrier substances as wood flour or brick- or tile-dust, which is driven through the nozzle 28 by means of air, oxygen or the like. An oil or coal dust burner 29 is disposed below the nozzle 28 in the wall of the shaft 1, the flame of which burner 29 is directed towards the pot 26.

The slag stream 25 originating in the melting vessel (not shown) falls at first onto the swingably mounted pot 26 and is whirled up and dispersed by means of the stirrer 27. Simultaneously the burnable matter fed from the nozzle 28 is admixed to the slag and maintained at melting temperature by means of the burner 29. The slag admixed with the coal powder or with other burnable material admixture, respectively, leads from the pot 26 in the form of the slag stream 2 through the shaft 1 towards the endless plate conveyer band 5 in order to be cooled off to a temperature most favorable for the gas release. In order to perform the gas release faster and safer, the plate conveyer band 5 may be equipped with a vibrating device 30.

Figure 3:
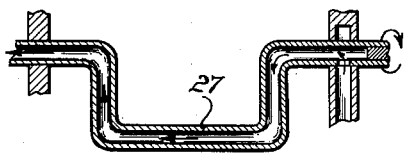
Fig. 3 is a fragmentary section of a detail of the apparatus shown in Fig. 2.

As it may be ascertained from Fig. 3 of the drawing, the stirrer 27 comprises a stirring-gear, for instance a cranked hollow shaft through which water is fed.

Instead of feeding coal powder or a mixture of oil-containing matter and carrier substances, for instance, wood flour or brick- or tile-dust through the nozzle 28, it is possible to admix another finely powdered solid matter to the slag stream 25, for instance, cement, flue ash or coke dust. In these cases no or a very low reduction of the slag takes place. The slag is rendered, thereby, more coarse than if a fine fat coal is used. It is also possible to admix to the slag stream 25 sprayed on oil or fat, however, in such cases a fast burning up of these ingredients and for this reason larger pores than those achieved with fine powderized coal must be taken into account.

Example

The slag to be treated in accordance with the present invention may have the following composition:

| | Percent |
|---|---|
| $SiO_2$ | 45–52 |
| $Al_2O_3$ | 28–35 |
| $Fe_2O_3$ | 8–14 |
| CaO | 3–5 |
| MgO | 1–3 |
| S particles | <1 |
| $SO_3$ | <1 |

The temperatures stated above for the individual phases of the method of the present invention relate particularly to a slag of a composition given in the example. For the control of the freeing of the gases and of the formation of the pores in the granule, it is possible to use the change in the viscosity as directive instead of or in addition to the choice of the temperature. It is to be remarked that a temperature of 900° C. corresponds to a value of from $2 \cdot 10^4$ to $8 \cdot 10^4$ poises, a temperature of 700° C. corresponds with a value of about $2 \cdot 10^7$ to $10^8$ poises, a temperature of 560° corresponds with a value of about $2 \cdot 10^9$ to $8 \cdot 10^9$ poises, and a temperature of 490° C. with a value of $10^{13}$.

While we have disclosed several embodiments of the present invention, it is to be understood that these embodiments are given by example only and not in a limiting sense, the scope of the present invention being determined by the claims.

We claim:

1. A method of manufacture of porous slag as admixture for concrete and similar purposes from acid vessel slag by cooling the liquid in a plurality of stages under consideration of the viscosity conditions, comprising the steps of a first period of reducing the temperature of a liquid slag stream to a level of a temperature range above about 700° C. at which gases dissolved therein are freed for a time period of about 2 to 10 minutes, the viscosity of said slag stream being within the range of from $2 \cdot 10^4$ to $8 \cdot 10^4$ poises up to $2 \cdot 10^7$ to $10^8$ poises, thereafter a second period of accelerated reducing of the temperature upon reaching the lower limit of said temperature range until a viscosity of $2 \cdot 10^9$ to $8 \cdot 10^9$ poises is reached for a time period of about 1 to 2 minutes, then a third period of slow reducing of the temperature at a pace of about 5° C. to 10° C., per minute, the viscosity of said slag stream in said third period reached being $10^{13}$ poises, and finally a fourth period of reducing the temperature at any selected speed to obtain a glass-like, lightened final product having a viscosity above $10^{13}$ poises.

2. The method, as set forth in claim 1, wherein in said first period the temperature of said liquid slag stream is reduced from about 900° C. to about 700° C.

3. The method, as set forth in claim 1, wherein in said second period the temperature of said liquid slag stream is reduced from about 700° C. to about 560° C.

4. The method, as set forth in claim 1, wherein said slow reducing of the temperature in said third period is achieved by heat radiation during the downward movement of said slag stream by its own gravity.

5. The method, as set forth in claim 1, which includes the step of admixture in small quantities of a matter forming pores for gas blisters, to said liquid slag stream prior to reaching said temperature level required for freeing said gases dissolved therein.

6. The method, as set forth in claim 1, which includes the step of admixture of a burnable material to said slag stream prior to reaching said temperature level required for freeing said gases dissolved therein.

7. The method, as set forth in claim 6, wherein said burnable material is admixed at an amount of about 0.5% by weight of the total weight of said slag stream.

8. The method, as set forth in claim 6, wherein said burnable material comprises coal powder.

9. The method, as set forth in claim 6, wherein said burnable material comprises a mixture of oil-containing matter with carrier substances.

10. The method, as set forth in claim 6, wherein said burnable material is blown onto said slag stream and stirred thereinto at a temperature of about 1300° C.

11. The method, as set forth in claim 10, wherein an inactive reaction period of about 10 to 40 seconds is provided between said stirring step of said burning material and the further treatment of said slag stream.

12. The method, as set forth in claim 1, wherein said slag is subjected to vibration upon reaching said temperature level required for freeing said gases dissolved therein.

References Cited in the file of this patent

UNITED STATES PATENTS

| | | |
|---|---|---|
| 883,770 | Wood | Apr. 7, 1908 |
| 1,849,090 | Hunsaker | Mar. 15, 1932 |
| 2,026,207 | Bjorkman | Dec. 31, 1935 |
| 2,067,312 | Coryell | Jan. 12, 1937 |
| 2,217,808 | Nye | Oct. 15, 1940 |
| 2,320,341 | Bowes | June 1, 1943 |
| 2,428,249 | Stuart et al. | Sept. 30, 1947 |
| 2,494,999 | Halkins | Jan. 17, 1950 |
| 2,498,904 | Wheeler | Feb. 28, 1950 |
| 2,590,901 | Stout et al. | Apr. 1, 1952 |

FOREIGN PATENTS

| | | |
|---|---|---|
| 525,822 | Great Britain | Sept. 5, 1940 |